US012692058B2

(12) United States Patent
Imaizumi et al.

(10) Patent No.: US 12,692,058 B2
(45) Date of Patent: Jul. 28, 2026

(54) LAMINATE AND STANDING POUCH

(71) Applicant: TOPPAN INC., Tokyo (JP)

(72) Inventors: Shukiko Imaizumi, Tokyo (JP);
Kazuyoshi Ro, Tokyo (JP)

(73) Assignee: TOPPAN INC., Tokyo (JP)

( * ) Notice: Subject to any disclaimer, the term of this patent is extended or adjusted under 35 U.S.C. 154(b) by 410 days.

(21) Appl. No.: 18/125,488

(22) Filed: Mar. 23, 2023

(65) Prior Publication Data

US 2023/0227227 A1     Jul. 20, 2023

Related U.S. Application Data

(63) Continuation of application No. PCT/JP2021/034618, filed on Sep. 21, 2021.

(30) Foreign Application Priority Data

Sep. 25, 2020    (JP) ................................. 2020-160723
Sep. 25, 2020    (JP) ................................. 2020-160726

(51) Int. Cl.
   *B65D 65/40*       (2006.01)
   *B32B 7/12*       (2006.01)
            (Continued)

(52) U.S. Cl.
   CPC ................ *B65D 65/40* (2013.01); *B32B 7/12* (2013.01); *B32B 27/08* (2013.01); *B32B 27/32* (2013.01); *B32B 27/322* (2013.01); *B65D 75/008* (2013.01); *B65D 75/58* (2013.01); *B32B 2250/242* (2013.01); *B32B 2255/10* (2013.01); *B32B 2255/26* (2013.01);
            (Continued)

(58) Field of Classification Search
   CPC .............. B65D 75/58; B65D 2565/385; B65D 2207/00; B32B 2250/242; B32B 2255/10; B32B 2255/26; B32B 2255/28; B32B 2270/00; B32B 2307/516; B32B 2307/546; B32B 2307/5825; B32B 2439/06; B32B 27/325; B32B 27/40; B32B 2250/24; Y02W 30/80
   See application file for complete search history.

(56) References Cited

U.S. PATENT DOCUMENTS

| | | |
|---|---|---|
| 2013/0147444 A1 | 6/2013 | Temkin |
| 2023/0147444 A1 | 5/2023 | Hablot et al. |

FOREIGN PATENT DOCUMENTS

| | | |
|---|---|---|
| EP | 3 797 988 A1 | 3/2021 |
| JP | H11-077924 A | 3/1999 |

(Continued)

OTHER PUBLICATIONS

English machine translation for JP2019-166810. (Year: 2019).*

(Continued)

*Primary Examiner* — Michael C Miggins
(74) *Attorney, Agent, or Firm* — Foley & Lardner LLP

(57) ABSTRACT

A laminate includes a substrate layer and a heat-sealing layer. A fold of the laminate produced by a weight of a 2 kg roller has a folding angle of 20 to 55°, and a content of polyethylene in the laminate is 90% by mass or more. The folding angle may be 25 to 55°. The substrate layer may contain high-density polyethylene. The substrate layer may be a uniaxially oriented linear low-density polyethylene film or an unstretched film made of polyethylene.

10 Claims, 6 Drawing Sheets

(51) Int. Cl.

| | |
|---|---|
| B32B 27/08 | (2006.01) |
| B32B 27/32 | (2006.01) |
| B65D 75/00 | (2006.01) |
| B65D 75/58 | (2006.01) |

(52) U.S. Cl.
CPC ....... *B32B 2255/28* (2013.01); *B32B 2270/00* (2013.01); *B32B 2307/516* (2013.01); *B32B 2307/546* (2013.01); *B32B 2307/5825* (2013.01); *B32B 2439/06* (2013.01); *B65D 2207/00* (2013.01); *B65D 2565/385* (2013.01)

(56) References Cited

FOREIGN PATENT DOCUMENTS

| | | |
|---|---|---|
| JP | 2002-087459 A | 3/2002 |
| JP | 5197952 B2 | 5/2013 |
| JP | 2017-088194 A | 5/2017 |
| JP | 2017-178348 A | 10/2017 |
| WO | WO-2018/221495 A1 | 12/2018 |
| WO | WO-2021/152969 A1 | 8/2021 |

OTHER PUBLICATIONS

English machine translation for JP2017-178348. (Year: 2017).*
English machine translation for WO2020110882 (Jun. 4, 2020). (Year: 2020).*
International Searching Authority, "International Search Report," issued in connection with International Patent Application No. PCT/JP2021/034618, dated Nov. 30, 2021.
International Searching Authority, "Written Opinion," issued in connection with International Patent Application No. PCT/JP2021/034618, dated Nov. 30, 2021.
European Extended Search Report issued in corresponding European Patent Application No. 21872442.5 dated Jan. 25, 2024 (7 pages).

* cited by examiner

LAMINATE AND STANDING POUCH

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/034618, filed on Sep. 21, 2021, which in turn claims the benefit of JP 2020-160723, filed Sep. 25, 2020 and of JP 2020-160726, filed Sep. 25, 2020, the disclosures of all which are incorporated herein by reference in its entirety.

TECHNICAL FIELD

The present disclosure relates to laminates for packaging, and in particular, laminates applicable to standing pouches.

BACKGROUND

A packaging body is used by combining various materials depending on the nature of the contents to be packaged, the amount of contents, post-treatment for protecting the contents from deterioration, the mode of transportation of the packaging body, how the packaging body is opened, how the packaging body is disposed of, and the like.

For example, standing pouches are being widely employed since they make products stand out on store shelves. For a standing pouch to be visible on all sides without bending in the middle, the laminate that makes up the pouch is required to have rigidity. When the standing pouch contains liquid, it must be strong enough to prevent breakage when dropped. In order to achieve these functions, laminates formed by combining a polyester film, nylon film, polyolefin film, and the like have been used.

However, due to the recent increase in environmental concerns, various products are required to have functions such as resource saving and reusability, and the laminates used to form packaging bodies are also being required to have similar functions.

One method of reusing a laminate in which various materials are combined is to decompose the laminate back into individual materials. However, various effects including thermal, chemical, and mechanical effects are required in order to decompose a laminate imparted with a certain strength as a packaging body. The separation of materials after the decomposition also requires physical effect based on specific gravity, a spectroscopic method which differs depending on the material, and the like. To increase the accuracy of these decomposition and separation processes, more energy is required, which makes the decomposition and separation inefficient.

Another method is to form the original laminate using materials of the same type, and reuse the laminate as a single composite material. In particular, thermoplastic resins include various types of materials such as polyolefin, polyester, and polyamide materials. Each of these materials can impart various properties depending on its molecular weight, molecular weight distribution, heat treatment, orientation, stretching, and the like. In particular, polyolefin materials are easy to use because they have good workability due to their low melting points, and because various materials are being manufactured including copolymers. Therefore, various methods have been proposed.

PTL 1 discloses a laminate including a uniaxially oriented polyolefin resin film and a polyolefin heat-sealing layer.

Although the main object of the present invention is to provide a laminate having an easily tearable uniaxially stretched film, the laminate is made of the same type of resins. However, the strength of the packaging body is not specified, and further, PTL 1 states that the laminate may include a biaxially oriented film such as a biaxially oriented nylon or polyester film as necessary. Such laminating body does not overcome the issue of environmental concerns.
[Citation List] [Patent Literature] [PTL 1] JP 5197952 B.

SUMMARY OF THE INVENTION

Technical Problem

The present disclosure provides a laminate used to produce standing pouches that can be recycled and allows a user to easily squeeze out the contents of the standing pouch. The present disclosure also provides a standing pouch produced using this laminate.

Solution to Problem

A laminate according to the present disclosure includes a substrate layer and a heat-sealing layer. A fold of the laminate produced by a weight of a 2 kg roller has a folding angle of 20 to 55°, and a content of polyethylene in the laminate is 90% by mass or more.

Since the content of polyethylene in the laminate is 90% by mass or more, the laminate according to the present disclosure is substantially made of a mono-material. Therefore, the laminate according to the present disclosure can be recycled. In the present disclosure, a mono-material laminate refers to a laminate in which a mass ratio of a specific material (for example, polyethylene) is 90% by mass or more (preferably 95% by mass or more).

A fold of the laminate made using a roller has a folding angle of 20 to 55°. According to testing conducted by the inventors of the present invention, when similar folds were made using a conventional laminate for standing pouches (nylon film (thickness: 15 μm)/aluminum-deposited PET film (thickness: 12 μm)/linear low-density polyethylene film), the angle was greater than 60°. When the folding angle is 55° or less, it is easy for a user to bend or roll the standing pouch. This is advantageous in that the contents of the standing pouch can be easily squeezed out. On the other hand, a folding angle of 20° or more enables the laminate to have a certain degree of stiffness, making it easier to ensure that the standing pouch is self-standing.

The folding angle of the laminate can be adjusted by adopting the following means.

(1) The substrate layer contains high-density polyethylene, and the content ratio of the high-density polyethylene is adjusted. The larger the content ratio of the high-density polyethylene, the greater the folding angle.

(2) A stretched film such as a uniaxially or biaxially oriented linear low-density polyethylene film is used as the substrate layer. When a stretched film is used, the folding angle tends to increase as compared with a case where a non-stretched film is used.

(3) A mixture of linear low-density polyethylene and cyclic polyolefin is used to form the heat-sealing layer. The larger the content ratio of the cyclic polyolefin in the heat-sealing layer, the greater the folding angle.

(4) An adhesive layer is provided between the substrate layer and the heat-sealing layer. The folding angle of the laminate can be adjusted by adjusting the rigidity of the adhesive layer.

The folding angle may be 25 to 55°.

The substrate layer may contain high-density polyethylene.

When the substrate layer contains high-density polyethylene, the substrate layer is less likely to melt when the laminate is heat-sealed.

The substrate layer may be a stretched linear low-density polyethylene film.

A stretched linear low-density polyethylene film can resist the heat during heat-sealing since it has a higher melting point than an unstretched linear low-density polyethylene film. Accordingly, it is possible to prevent the substrate layer from melting during heat sealing. The stretched linear low-density polyethylene film may either be an uniaxially oriented linear low-density polyethylene film or biaxially oriented linear low-density polyethylene film.

The substrate layer may be an unstretched film made of polyethylene.

When the substrate layer is an unstretched film, the resin is hardly oriented. This makes the film more stretchable and less likely to break when external stress such as stretching or piercing stress is applied thereto.

The heat-sealing layer may be made of a mixture containing a linear low-density polyethylene having a density lower than 0.925 g/cm$^3$ and a cyclic polyolefin.

In this case, the laminate has an easy tear-opening properties. When the substrate layer is an unstretched film made of polyethylene, the laminate can have particularly excellent easy tear-opening properties.

The laminate may further include an adhesive layer between the substrate layer and the heat-sealing layer.

The stiffness of the laminate can be adjusted by providing such an adhesive layer. By providing such an adhesive layer, the interlayer adhesion between the substrate layer and heat-sealing layer is enhanced. This makes delamination less likely to occur while maintaining the pressure resistance and impact resistance of the pouch. When an ink layer (printing layer) or a coating agent layer (anchor coat layer) is provided between the layers, there is a need to impart tight adhesion between the resins contained in these layers and the polyethylene of the substrate layer or heat-sealing layer (in other words, between different resins).

A standing pouch according to the present disclosure includes the above laminate. According to this standing pouch, it is possible to realize a mono-material, and it is also easy to squeeze out the contents of the standing pouch. Further, since this standing pouch can be easily bent and rolled, it tends to maintain a compact size when the standing pouch is discarded.

Advantageous Effects of the Invention

According to the present disclosure, a laminate used to produce standing pouches that can be recycled and allows a user to easily squeeze out the contents of the standing pouch is provided. The present disclosure also provides a standing pouch produced using this laminate.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Figure 1:
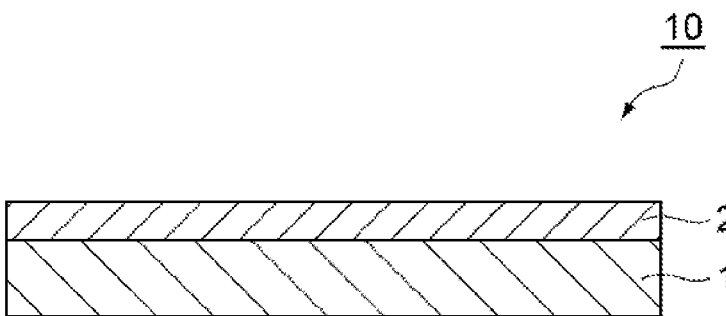
FIG. 1 is a schematic cross-sectional view showing a laminate according to an embodiment of the present disclosure.

As shown in FIG. 1, a laminate 10 according to the present embodiment includes a substrate layer 1 and a heat-sealing layer 2. The content of polyethylene in the laminate 10 is 90% by mass or more. When the content of polyethylene in the laminate is 90% by mass or more, a mono-material can be obtained. This facilitates resin regeneration (recycling). In addition, this makes the laminate 10 more impact-resistant since it becomes softer and more stretchable. The content of polyethylene in the laminate 10 is more preferably 95% by mass or more, and even more preferably 98% by mass or more.

The laminate 10 can be easily bent and rolled. That is, when the laminate 10 is bent to make a fold using the weight of a 2 kg roller, the folding angle of the fold is 55° or less, preferably 50° or less, and more preferably 45° or less. This feature is useful for applying the laminate 10 to the manufacture of standing pouches. That is, when the folding angle is 55° or less, it is easy for a user to bend or roll the standing pouch. This is advantageous in that the contents of the standing pouch can be easily squeezed out.

In addition, the laminate 10 has a moderate stiffness. That is, when the laminate 10 is bent to make a fold using the weight of a 2 kg roller, the folding angle of the fold is 20° or more, preferably 25° or more, more preferably 30° or more, and especially preferably 35° or more. This feature is also useful for applying the laminate 10 to the manufacture of standing pouches. That is, when the folding angle is 20° or more, it is easy to ensure that the standing pouch can be self-standing. The folding angle can be defined by bending the laminate 10, moving the roller in a direction perpendicular to the fold (for example, MD direction) so that it passes over the fold twice, measuring an angle α formed by the two faces extending from the fold to the respective sides thereof, repeating this process three times in total, and taking an average of the angles α obtained from the three measurements.

In the case where the laminate 10 includes a film, considering the ease of squeezing out the contents of the standing pouch, the folding angle may preferably be within the above range regardless of whether the fold is made in the MD direction or TD direction of the film. When squeezing out the contents of the standing pouch, the user folds or rolls the standing pouch from the bottom toward the opening, or folds or rolls it from the lateral sides toward the center. In a state where the standing pouch is standing on a horizontal plane, the TD direction of the laminated film forming the standing pouch is the vertical direction, and the MD direction is the horizontal direction.

[Substrate Layer]

The substrate layer 1 is formed of polyethylene. Examples of polyethylenes include high density polyethylene (HDPE), medium density polyethylene (MDPE), and low-density polyethylene (LDPE). Considering the melting point, the substrate layer 1 may preferably be formed using HDPE and MDPE resins having a density of 0.925 g/cm³ or more. In particular, it is preferable to use a high-density polyethylene having a density of 0.93 to 0.98 g/cm³. This makes the substrate layer 1 less likely to melt when the laminate 10 is heat-sealed.

The substrate layer 1 may be formed of, for example, a stretched LLDPE film. The stretching may either be uniaxial stretching or biaxial stretching. Since a stretched LLDPE film has a higher melting point than an unstretched LLDPE film, it can withstand the heat during heat sealing. The density of LLDPE is, for example, lower than 0.925 g/cm³, and may be 0.900 to 0.920 g/cm³.

The substrate layer 1 may be an unstretched film made of polyethylene. When the substrate layer 1 is an unstretched film, the resin is hardly oriented. This makes the film more stretchable and less likely to break when external stress such as stretching or piercing stress is applied thereto.

The resin used to form the substrate layer 1 is not limited to petroleum-derived resin, and may partially or entirely contain bio-derived resin (for example, biomass polyethylene obtained using biomass-derived ethylene as a raw material). An example of a method for producing biomass-derived polyethylene is disclosed in JP 2010-511634 A. It is also possible to use a commercially available biomass polyethylene (for example, Green PE manufactured by Braskem S.A.). The substrate layer may contain a mechanically-recycled polyethylene obtained from used polyethylene products or resin produced during the manufacturing of polyethylene products (so-called burrs). The substrate layer 1 may contain other resin components as a resin in addition to polyethylene such as the above described LLDPE. Examples of other resin components include polyethylene terephthalate, polypropylene, and polyvinyl alcohol. The content of these other resin components is, for example, preferably 15% by mass or less, more preferably 10% by mass or less, relative to the total mass of the substrate layer. The substrate layer may partially contain a biodegradable resin material (for example, polylactic acid, polycaprolactone, polyhydroxyalkanoate, polyglycolic acid, modified polyvinyl alcohol, casein, modified starch, or the like) as the resin. A mixture of additives such as an antistatic agent, ultraviolet absorber, plasticizer, lubricant, and colorant may be added to the substrate layer 1 as necessary.

The thickness of the substrate layer 1 may be, for example, 10 to 50 μm, or may be 20 or 50 μm. The bendability and rigidity of the laminate 10 can be adjusted by adjusting the thickness of the substrate layer 1.

[Heat Sealing Layer]

The heat-sealing layer 2 is a layer having a heat-sealing properties, and, for example, is made of polyethylene having a melting point higher than that of the substrate layer 1. Examples of polyethylenes that may be used to form the heat-sealing layer 2 include linear low-density polyethylene (LLDPE) and very low-density polyethylene (VLDPE). In particular, it is preferable to use a polyethylene having a density of 0.900 to 0.920 g/cm³. To achieve the heat-sealing properties, the melting point of the resin forming the heat-sealing layer 2 may preferably be in the range of 40 to 160° C., more preferably in the range of 80 to 140° C.

The heat-sealing layer 2 may contain cyclic polyolefin. An example of cyclic polyolefin is a cycloolefin copolymer (COC) obtained by copolymerizing norbornene and ethylene. In the cycloolefin copolymer, the content of norbornene may preferably be in the range of 60 to 85% by mass, more preferably 60 to 80% by mass, and even more preferably 65 to 70% by mass, relative to the total mass of the monomers forming the copolymer. When the content of norbornene is within these ranges, it is possible to increase the easy tear-opening properties of the laminate 10 while maintaining the heat-sealing properties. The density of the cyclic polyolefin may preferably be 0.95 to 1.05 g/cm³, and more preferably be 1.01 to 1.04 g/cm³. When the density is within these ranges, it is possible to increase the easy tear-opening properties of the laminate 10.

The heat-sealing layer 2 may preferably be made of a mixture containing a linear low-density polyethylene having a density lower than 0.925 g/cm³ and a cyclic polyolefin. In this case, the laminate 10 has an easy tear-opening properties. When the substrate layer 1 is an unstretched film made of polyethylene, the laminate 10 can have particularly excellent easy tear-opening properties. The linear low-density polyethylene having a density lower than 0.925 g/cm³ may preferably be a linear low-density polyethylene having a density of 0.900 to 0.920 g/cm³.

The content of cyclic polyolefin in the heat-sealing layer 2 may preferably be in the range of 1 to 30% by mass, more preferably 3 to 25% by mass, and even more preferably 5 to 20% by mass, relative to the total mass of the heat-sealing layer. When the content of cyclic polyolefin is 1% by mass or more, the rigidity of the laminate 10 tends to increase. When the content of cyclic polyolefin is 30% by mass or more, the bendability tends to increase. It also reduces decrease in the heat-sealing properties as well as decrease in the recyclability. In addition, when the content of cyclic polyolefin is within the above ranges, the easy tear-opening properties of the laminate 10 tend to improve.

Alternatively, the content of the cyclic polyolefin in the heat-sealing layer 2 may be 5% by mass or more or 10% by mass or more, relative to the total mass of the heat-sealing layer. When the content of cyclic polyolefin is equal to or more than the lower limit, it is possible to further improve the ease of opening the laminate by tearing.

The heat-sealing layer 2 may contain other resins, additives, or the like other than the polyethylene and cyclic polyolefin described above. Examples of other resins include polypropylene, an ethylene-vinyl acetate copolymer, a propylene-ethylene copolymer, an ethylene-1-butene copolymer, a propylene-1-butene copolymer, an ethylene-propylene-butadiene copolymer, and an ethylene-propylene-1-butene copolymer. Examples of the additives include heat stabilizers, antioxidants, ultraviolet absorbers, anti-blocking agents, lubricants, and antistatic agents. The heat-sealing layer 2 may contain biomass polyethylene obtained from a biomass-derived ethylene as the polyethylene. The heat-sealing layer 2 may contain a mechanically-recycled polyethylene obtained from used polyethylene products or resin produced during the manufacturing of a polyethylene product (so-called burrs).

The thickness of the heat-sealing layer 2 may be, for example, 30 to 150 μm, or may be 60 or 150 μm. The bendability and rigidity of the laminate 10 can be adjusted by adjusting the thickness of the heat-sealing layer 2.

As for the method for forming the heat-sealing layer 2, it may be formed with a known lamination method such as dry lamination in which a heat-sealing layer in the form of a film made of the above materials is laminated using an adhesive such as a one-component or two-component urethane adhesive, non-solvent dry lamination in which a heat-sealing layer in the form of a film is laminated using a solvent-free adhesive, or extrusion lamination in which the above materials are heated and melted, extruded in such a way that it has a curtain-like shape, and then laminated. When an adhesive is used, an adhesive layer described later is provided between the substrate layer 1 and the heat-sealing layer 2.

Methods for laminating the substrate layer 1 and the heat-sealing layer 2 with heat treatment include the following methods.

(1) A method of extruding an adhesive resin between the substrate layer 1 and heat-sealing layer 2 formed in advance.

(2) A method of co-extruding the heat-sealing layer 2 with the adhesive resin and laminating them with the substrate layer 1.

(3) A method of bonding the laminate substrate obtained by the above method (1) or (2) by further heating and pressurizing with a hot roll.

(4) A method of storing the laminate substrate obtained by the above method (1) or (2) under a high-temperature atmosphere, or passing it through a drying/baking furnace under a high-temperature atmosphere.

An example of an adhesive resin used in a lamination method involving heat treatment is acid-modified polyolefin. Although the substrate layer 1 and heat-sealing layer 2 are laminated by extrusion lamination in the above methods, it is also possible to apply and form an acid-modified polyolefin coating agent (dissolved type or dispersed type) onto the substrate layer 1, and then laminate the heat-sealing layer 2 by heat treatment without performing extrusion lamination.

As described above, the laminate 10 includes the substrate layer 1 and the heat-sealing layer 2, but it may also include, for example, an adhesive layer (not shown) between the substrate layer 1 and the heat-sealing layer 2. The adhesive forming the adhesive layer can be selected according to the bonding method. It may be a urethane adhesive or polyester adhesive, for example. The stiffness of the laminate can be adjusted by providing such an adhesive layer. By providing such an adhesive layer, the interlayer adhesion between the substrate layer 1 and heat-sealing layer 2 is enhanced. This makes delamination less likely to occur while maintaining the pressure resistance and impact resistance of the pouch. When an ink layer (printing layer) or a coating agent layer (anchor coat layer) is provided between the layers, there is a need to impart tight adhesion between the resins contained in these layers and the polyethylene of the substrate layer 1 or heat-sealing layer 2 (in other words, between different resins).

The adhesive layer preferably does not contain chlorine. Since the adhesive layer does not contain chlorine, it is possible to prevent the adhesive layer from being colored during remelting, and from generating an odor during heat treatment, for example. Considering the environmental impact, the compound contained in the adhesive may preferably be a biomass material. Further, considering the environmental impact, the adhesive preferably does not contain a solvent.

The laminate 10 according to the present embodiment may include an anchor coat layer between the substrate layer 1 and the heat-sealing layer 2. The anchor coat layer can provide effects such as improving the adhesion between the substrate layer 1 and the heat-sealing layer 2, improving the adhesion between an ink or coating agent and the polyethylene of the substrate layer or the heat-sealing layer (in other words, between different resins), and improving the smoothness of the surface of the substrate layer 1. The anchor coat layer can be formed using a composition (anchor coat agent) for forming an anchor coat layer.

Examples of the anchor coat agents include acrylic resin, epoxy resin, acrylic urethane resin, polyester polyurethane resin, polyether polyurethane resin, and polyvinyl alcohol resin. Among these anchor coat agents, acrylic urethane resin and polyester polyurethane resin are preferred from the aspect of heat resistance and interlayer adhesion strength.

Although the thickness of the anchor coat layer is not particularly limited, preferably, it is in the range of 0.01 to 5 μm, more preferably 0.03 to 3 μm, and even more preferably 0.05 to 2 μm. When the anchor coat layer has a thickness equal to or more than the lower limit, even more sufficient interlayer adhesion strength tends to be obtained. On the other hand, when the thickness of the anchor coat layer is equal to or less than the upper limit, the polyethylene content in the laminate tends to be increased.

The anchor coat layer can be coated on the substrate layer 1 using any known coating method; such as by using a sprayer, a coater, a printer, a brush, or the like, or by the immersion method (dipping method).

As for the coating amount of the anchor coat layer, preferably the mass per square meter after coating and drying the anchor coat agent is 0.01 to 5 g/m$^2$, and more preferably 0.03 to 3 g/m$^2$. When the mass per square meter after coating and drying the anchor coat agent is equal to or more than the lower limit, film formation tends to be sufficient. On the other hand, when the mass per square meter after coating and drying the anchor coating agent is equal to or lower than the upper limit, the agent tends to dry sufficiently and there tends to be no residual solvent.

Further, in addition to the substrate layer 1 and the heat-sealing layer 2, the laminate 10 may also include a barrier layer, a printing layer, a separate PE layer, or the like. These layers may be provided, for example, between the substrate layer 1 and the heat-sealing layer 2, or may be provided on the surface of the heat-sealing layer 2 opposite to the substrate layer 1. When a printing layer is provided, it is preferable to use a printing ink that does not contain chlorine in order to prevent the printing layer from being colored during remelting, and from generating an odor. Considering the environmental impact, the compound contained in the printing ink may preferably be a biomass material.

<Packaging Bag>

A packaging bag is a bag formed of the above-described laminate 10. The packaging bag may be made by folding a sheet of the laminate 10 in two so that parts of the heat-sealing layers 2 face each other, and then heat-sealing two or three sides so that it forms a bag. It is also possible to stack two laminate 10 sheets so that their heat-sealing layers 2 face each other, and then heat-sealing three or four sides so that they form a bag. The packaging bag may contain food, pharmaceuticals, or the like as contents. The packaging bag may be subjected to heat sterilization such as boiling.

Boiling is a method of performing moist-heat sterilization for preserving food, pharmaceuticals, and the like. Usually, depending on the contents, a food or the like packaged by a packaging bag is subjected to moist-heat sterilization for 10 to 120 minutes at 60° C. to 100° C., under atmospheric pressure. Normally, boiling is performed at a temperature of 100° C. or less using a hot-water tank. As the method used, there is a batch type method of immersing a package in a hot-water tank at a certain temperature and removing the package after processing has been performed for a certain amount of time, and there is a continuous method by which a package is treated by passing the package through a hot-water tank using a tunnel method. The packaging bag of the present embodiment can be suitably used for boiling treatment.

Figure 3:
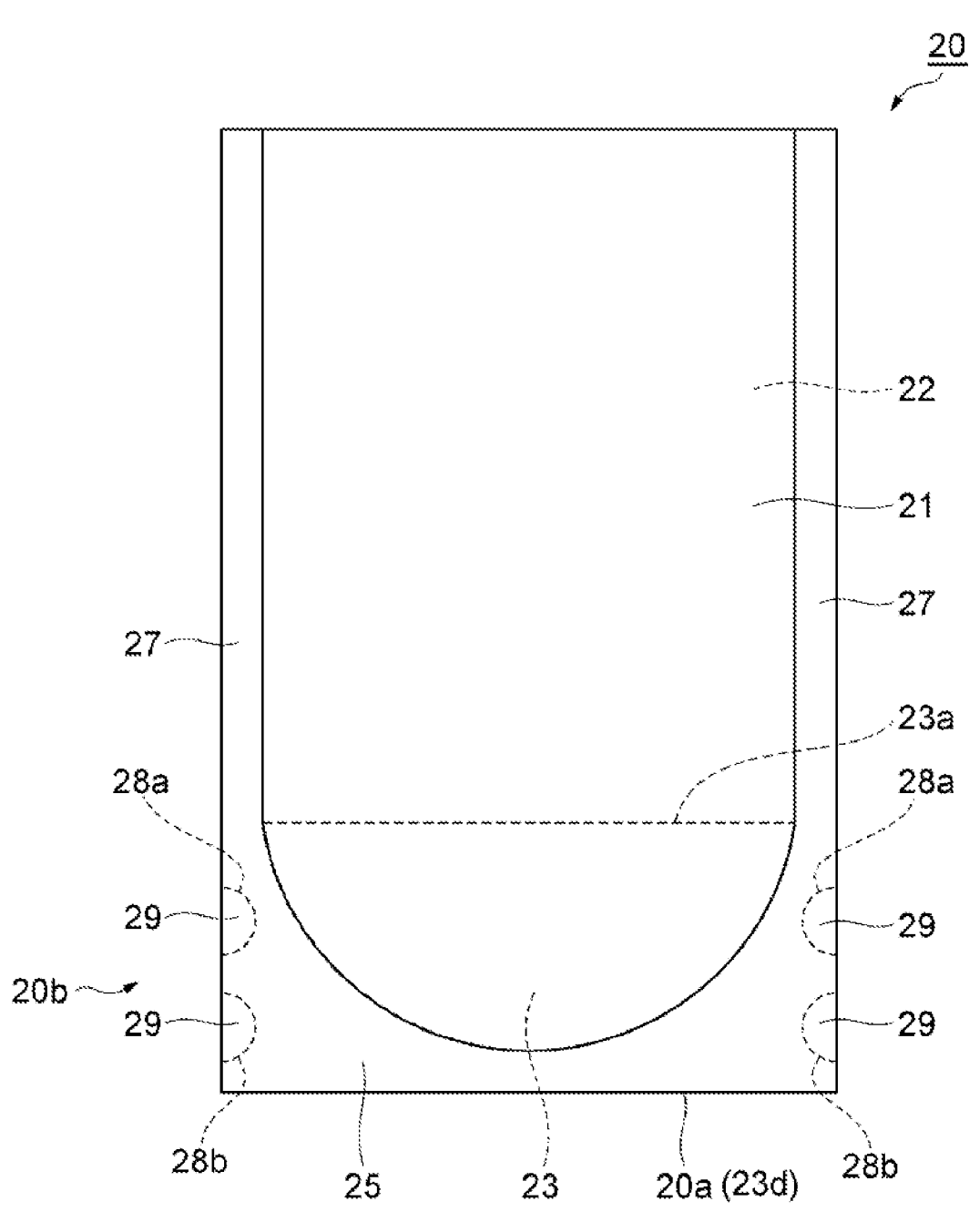
FIG. 3 is a front view of an embodiment of a standing pouch according to the present disclosure.

In addition, the packaging bag may be a standing pouch having a shape with a bent portion (folded portion). The packaging bag of the present embodiment can maintain good gas barrier properties even when it has a shape with a bent portion. An example of a packaging bag having a shape with a bent portion (folded portion) is a standing pouch. A standing pouch including the laminate described above has great recyclability and at the same time facilitates squeezing out the contents. Specific examples of the contents include viscous substances such as hand soap, body soap, shampoo, and hair conditioner. FIG. 3 is a front view of an embodiment of a standing pouch according to the present disclosure. A standing pouch 20 shown in FIG. 3 is formed by heat-sealing a pair of side body parts 21 and 22 and a bottom tape 23. Both the pair of side body parts 21 and 22 and the bottom tape 23 are formed of the laminate 10. The formation of the standing pouch using heat sealing can be carried similarly to the conventional methods.

The bottom tape 23 has one mountain-folded part 23*a*. That is, the bottom tape 23 is arranged so that it has an inverted V shape when the standing pouch 20 is self-standing. A first heat-sealing part 25 and a second heat-sealing part (not shown) make up the bottom of the standing pouch 20. The first heat-sealing part 25 is a part where the bottom part of the side body part 21 and one of the bottom parts of the bottom tape 23 are heat-sealed. The second heat-sealing part is a part where the bottom part of the side body part 22 and the other one of the bottom parts of the bottom tape 23 are heat-sealed. The side body parts 21 and 22 and the bottom tape 23 are heat-sealed so that the upper parts of the first heat-sealing part 25 and the second heat-sealing part form an arc shape, and the bottom part of the area holding the contents has a curved surface.

The standing pouch 20 has fused parts 29 on both sides of the bottom part 20*b*. In the present embodiment, two fused parts 29 are vertically aligned on one side of the standing pouch 20, and two fused parts 29 are also vertically aligned on the other side of the standing pouch 20. The fused parts 29 join the side body parts 21 and 22 together. The fused parts 29 are parts where the sealant layers of the side body parts 21 and 22 are locally fused together through cutout parts 28*a* and 28*b* provided in the bottom tape 23. The cutout parts 28*a* and 28*b* in the bottom tape 23 are provided in the area between the mountain-folded part 23*a* and a bottom side 23*d* at the side edges of the bottom tape 23.

EXAMPLES

The present disclosure will be described in more detail with reference to the following examples; however, the present disclosure is not limited to these examples.

<Preparation of Laminate>

Example 1

An LLDPE sealant layer (thickness: 100 μm; density: 0.91/cm³) was provided on an HDPE substrate layer (thickness: 35 μm; density: 0.94 g/cm³; unstretched). A laminate (two-layer structure) according to Example 1 was thus obtained. This laminate was substantially made of only polyethylene. That is, the content of polyethylene in this laminate was substantially 100% by mass.

Comparative Example 1

A conventional laminate (three-layer structure) used for standing pouches was prepared. That is, a laminate of a nylon film (thickness: 15 μm)/an aluminum-deposited PET film (VM-PET, thickness: 12 μm)/an LLDPE film (thickness: 110 μm) was prepared. The content of polyethylene in this laminate was 72% by mass.

Example 2

<Preparation of Anchor Coat Agent>

Acrylic polyol was mixed with tolylene diisocyanate so that the number of NCO groups in the tolylene diisocyanate matched the number of OH groups in the acrylic polyol, and the mixture was diluted with ethyl acetate so that the total solid content (the total mass of acrylic polyol and tolylene diisocyanate) became 5% by mass. To the mixed solution after dilution, 5 parts by mass of β-(3,4-epoxycyclohexyl) trimethoxysilane was further added to a total of 100 parts by mass of the acrylic polyol and tolylene diisocyanate, and these compounds were mixed to prepare an anchor coat agent.

<Preparation of Composition for Forming Heat Sealing Layer>

A linear low-density polyethylene (manufactured by Ube-Maruzen Polyethylene Co, Ltd., trade name: UMERIT 2040F, density: 0.918 g/cm³, MFR: 4.0 g/10 min) and a cyclic polyolefin (manufactured by POLYPLASTICS CO., LTD., trade name: TOPAS 8007, density: 1.02 g/cm³, norbornene content: 65% by mass, hereinafter also referred to as "COC") were mixed so that the COC content relative to the total mass of the composition is 20% by mass, 15% by mass, 10% by mass, or 5% by mass to prepare a composition for heat-sealing layer formation.

<Preparation of Laminate>

An anchor coat (AC) layer having a thickness of approximately 0.3 µm was formed using the above anchor coat agent on an unstretched high-density polyethylene (HDPE) film (manufactured by Charter Next Generation., trade name: GAP, thickness: 27 µm, density: 0.950 g/cm³, MFR: 0.83 g/10 min, tensile modulus (MD): 773 MPa, tensile modulus (TD): 1231 MPa) as the substrate layer. After that, the composition for heat-sealing layer formation having a COC content of 20% by mass was extruded onto the anchor coat layer by extrusion lamination to form a heat-sealing layer having a thickness of 25 µm. A laminate including the substrate layer/anchor coat layer/heat-sealing layer was thus obtained. The content of polyethylene in this laminate was 91% by mass.

<Folding Angle Measurement>

Figure 2A:
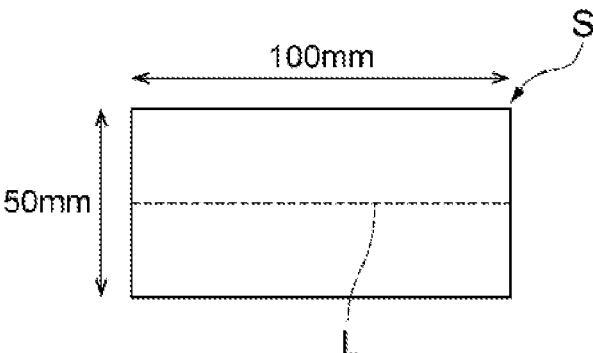
FIG. 2A is a plan view showing a sample used to measure a folding angle.
Figure 2B:
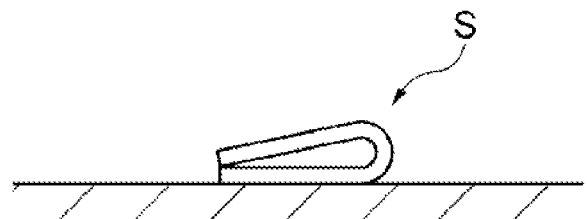
FIG. 2B is a side view schematically showing a loosely folded sample on a horizontal surface (before making a fold).
Figure 2C:
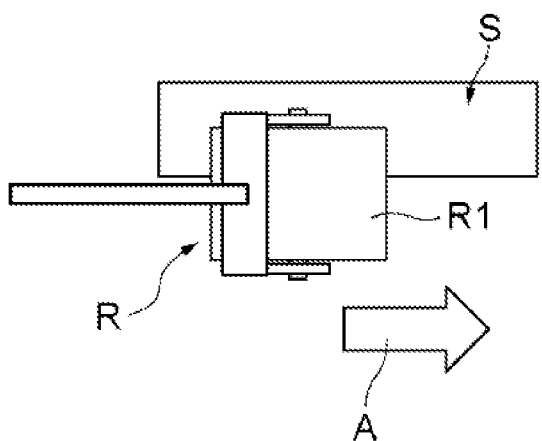
FIG. 2C is a top view schematically showing the process of making a fold on the sample with a roller.
Figure 2D:
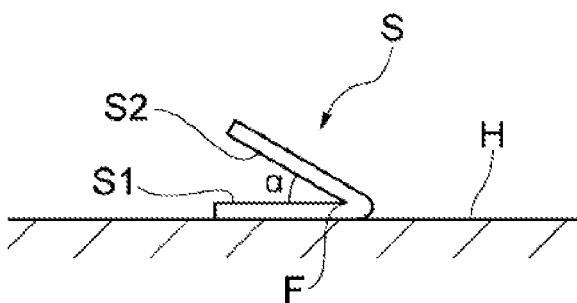
FIG. 2D is a side view showing a folded sample.

The laminates obtained in Examples 1 and 2 and Comparative Example 1 were each cut into 50 mm×100 mm piece to obtain a sample S for measurement (FIG. 2A). A broken line L in FIG. 2A indicates the place where the fold is to be made. Next, each sample S was loosely fold in half along the longitudinal direction (MD direction or TD direction) of the sample S (FIG. 2B). The sample S was folded so that the sealant layer is on the inner side. After that, a roll R was passed over the sample S once or twice in the direction of an arrow A to provide the sample S with a fold by the weight of a roller R1 of the roll R (FIG. 2C). The part of the sample S with the fold F was fixed on a horizontal surface H, and an angle α (folding angle) shown in FIG. 2D, that is, the angle between two faces S1 and S2 extending from the fold F of the sample S to the respective sides thereof was measured using a protractor. The rubber roller specified below was used as the roller R1. The measurement was performed three times each in the case of passing the roller R1 once and the case of passing the roller R1 twice. The results are shown in Table 1. These results show that the angle α may preferably be 20 to 55° when the roller R1 is passed once or twice. The folding angle was obtained by bending the laminate 10, moving the roller R1 in a direction perpendicular to the fold F (MD direction) so that it passes over the fold F twice, measuring the angle α formed by the two faces S1 and S2 extending from the fold F to the respective sides thereof, repeating this process three times in total, and taking an average of the angles α obtained from the three measurements. The folding angles were 33.3° in Example 1, 63.3° in Comparative Example 1, and 31.7° in Example 2.

(Rubber Roller)

Roller weight: 2 kg
Roller surface: Rubber (thickness 6 mm)
Roll width: 45 mm
Roll diameter: 85 mm

TABLE 1

| NUMBER OF ROLLER PASSES | | | ANGLE A | |
|---|---|---|---|---|
| | | | ONCE | TWICE |
| MD DIRECTION | EX. 1 | 1ST | 40° | 35° |
| | | 2ND | 50° | 40° |
| | | 3RD | 35° | 25° |

TABLE 1-continued

| NUMBER OF ROLLER PASSES | | | ANGLE A | |
|---|---|---|---|---|
| | | | ONCE | TWICE |
| | COMP. | 1ST | 70° | 60° |
| | EX. 1 | 2ND | 75° | 65° |
| | | 3RD | 75° | 65° |
| | EX. 2 | 1ST | 50° | 45° |
| | | 2ND | 23° | 20° |
| | | 3RD | 30° | 30° |
| TD DIRECTION | EX. 1 | 1ST | 45° | 40° |
| | | 2ND | 50° | 40° |
| | | 3RD | 35° | 30° |
| | COMP. | 1ST | 70° | 65° |
| | EX. 1 | 2ND | 75° | 70° |
| | | 3RD | 80° | 85° |
| | EX. 2 | 1ST | 50° | 40° |
| | | 2ND | 52° | 45° |
| | | 3RD | 50° | 42° |

With respect to the laminate including the substrate layer and the heat-sealing layer, when the heat-sealing layer is formed of a mixture containing a linear low-density polyethylene having a density lower than 0.925 g/cm³ and a cyclic polyolefin, and the substrate layer is an unstretched film made of polyethylene, the laminate can have an easy tear-opening properties regardless of the value of the folding angle. In order to demonstrate this, for reference, the following laminates were prepared and their tear strengths were measured.

<Preparation of Laminate>

Reference Examples 1 to 3

Laminates were obtained in the same manner as in Example 2 except that the heat-sealing layer was formed using a composition for heat-sealing layer formation having a COC content of 15% by mass, 10% by mass, or 5% by mass.

Reference Example 4

A laminate was obtained in the same manner as in Example 2 except that a stretched linear low-density polyethylene (LLDPE) film (manufactured by Mitsui Chemicals Tohcello, Inc., trade name: L-Smart C-1, thickness: 30 µm, density: 0.91 g/cm³) was used as the substrate layer.

Reference Example 5

An HDPE transparent deposition barrier film (manufactured by Toppan Inc., substrate thickness: 25 µm) formed by sequentially forming a deposition layer and a barrier layer on an HDPE substrate was formed on an unstretched high-density polyethylene (HDPE) film as the substrate layer (manufactured by Tamapoly Co., Ltd., trade name: HS31, thickness: 35 µm, density: 0.948 g/cm³, MFR: 1.5 g/10 min, tensile modulus (MD): 990 MPa, tensile modulus (TD): 1460 MPa) by dry lamination using a urethane adhesive. Next, the composition for heat-sealing layer formation having a COC content of 20% by mass was extruded onto the HDPE transparent deposition barrier film by extrusion lamination to form a heat-sealing layer having a thickness of 25 µm. A laminate including the substrate layer/HDPE transparent deposition barrier film/heat-sealing layer was thus obtained.

Reference Examples 6 to 8

Laminates were obtained in the same manner as in Reference Example 5 except that the heat-sealing layer was formed using a composition for heat-sealing layer formation having a COC content of 15% by mass, 10% by mass, or 5% by mass.

Reference Example 9

A laminate was obtained in the same manner as in Example 2 except that the heat-sealing layer was formed using a composition for heat-sealing layer formation that is solely a linear low-density polyethylene (manufactured by Ube-Maruzen Polyethylene Co, Ltd., trade name: UMERIT 2040F, density: 0.918 g/cm$^3$, MFR: 4.0 g/10 min).

Reference Example 10

A laminate was obtained in the same manner as in Reference Example 5 except that the heat-sealing layer was formed using a composition for heat-sealing layer formation that is solely a linear low-density polyethylene (manufactured by Ube-Maruzen Polyethylene Co, Ltd., trade name: UMERIT 2040F, density: 0.918 g/cm$^3$, MFR: 4.0 g/10 min).

<Tear Strength>

The standing pouches obtained in Example 2 and Reference Examples 2 to 10 were each cut into a 100 mm (MD direction)×30 mm (TD direction) piece. A 20 mm cut was made at the center of each piece in the TD direction, and the strength was measured (unit: N) when the samples were torn in the MD direction at a tear speed of 5000 mm/min according to the JIS K7128 A trouser method. The results are shown in Table 2. The values are average values with N=5.

TABLE 2

| LAYER CONFIGURATION | TEAR STRENGTH (N) |
|---|---|
| EX. 2 | HDPE (27 μm)/AC/2040F + COC(20%)(25 μm) | 0.5 |
| REF. EX. 1 | HDPE (27 μm)/AC/2040F + COC(15%)(25 μm) | 0.7 |
| REF. EX. 2 | HDPE (27 μm)/AC/2040F + COC(10%)(25 μm) | 0.5 |
| REF. EX. 3 | HDPE(27 μm)/AC/2040F + COC(5%)(25 μm) | 1.2 |
| REF. EX. 4 | LLDPE (30 μm)/AC/2040F + COC(20%)(25 μm) | 4.0 |
| REF. EX. 5 | HDPE (35 μm)/HDPE TRANSPARENT DEPOSITION BARRIER FILM (25 μm)/ 2040F + COC(20%)(25 μm) | 0.9 |
| REF. EX. 6 | HDPE (35 μm)/HDPE TRANSPARENT DEPOSITION BARRIER FILM(25 μm)/ 2040F + COC(15%)(25 μm) | 0.7 |
| REF. EX. 7 | HDPE (35 μm)/HDPE TRANSPARENT DEPOSITION BARRIER FILM(25 μm)/ 2040F + COC(10%)(25 μm) | 1.0 |

TABLE 2-continued

| LAYER CONFIGURATION | TEAR STRENGTH (N) |
|---|---|
| REF. EX. 8 | HDPE (35 μm)/HDPE TRANSPARENT DEPOSITION BARRIER FILM(25 μm)/ 2040F + COC(5%)(25 μm) | 0.9 |
| REF. EX. 9 | HDPE (27 μm)/AC/2040F(25 μm) | 10.1 |
| REF. EX. 10 | HDPE (27 μm)/HDPE TRANSPARENT DEPOSITION BARRIER FILM(25 μm)/ 2040F(25 μm) | 18.0 |

[Reference Signs List] 1 . . . Substrate layer; 2 . . . Heat sealing layer; 10 . . . Laminate; 20 . . . Standing pouch; R1 . . . Roller; F . . . Fold.

What is claimed is:

1. A laminate, comprising:

a substrate layer consisting of high-density polyethylene;

a heat-sealing layer consisting of linear low-density polyethylene and 5-20% of cyclic polyolefin, and an anchor coat layer between the substrate layer and the heat-sealing layer, the anchor layer being in direct contact with each of the substrate layer and the heat-sealing layer wherein a fold of the laminate produced by a weight of a 2 kg roller has a folding angle of 20 to 55°, a content of polyethylene in the laminate is 90% by mass or more, a thickness of the substrate layer is from 20 or 50 μm;

a thickness of the heat-sealing layer is from 25 to 30 μm; and a thickness of the anchor coat layer is from 0.05 to 2 μm.

2. The laminate of claim 1, wherein the folding angle is 25 to 55°.

3. The laminate of claim 1, wherein the anchor coat layer comprises acrylic urethane resin or polyester polyurethane resin.

4. The laminate of claim 1, wherein the substrate layer is an unstretched film.

5. The laminate of claim 4, wherein the anchor coat layer comprises acrylic urethane resin or polyester polyurethane resin.

6. The laminate of claim 5, wherein the laminate consists of the substrate, the anchor coat layer and the heat-sealing layer.

7. A standing pouch including the laminate of claim 1.

8. A laminate, consisting of a substrate layer consisting of high-density polyethylene; and a heat-sealing layer consisting of linear low-density polyethylene, wherein the substrate layer is an unstretched film;

a fold of the laminate produced by a weight of a 2 kg roller has a folding angle of 20 to 55°, and a content of polyethylene in the laminate is 90% by mass or more.

9. The laminate of claim 8, wherein the folding angle is 25 to 55°.

10. A standing pouch including the laminate of claim 8.

* * * * *